(12) United States Patent
Morisi et al.

(10) Patent No.: US 6,402,428 B1
(45) Date of Patent: Jun. 11, 2002

(54) PIPELINE RECOVERY TOOL

(75) Inventors: Ziba Morisi, Katy, TX (US); Raymond Joseph Serpas, New Orleans; Kevin Patrick Zaeringer, Metairie, both of LA (US); Dennis Earl Calkins, Katy, TX (US)

(73) Assignee: J. Ray McDermott, S.A., Housto, TX (US)

( * ) Notice: Subject to any disclaimer, the term of this patent is extended or adjusted under 35 U.S.C. 154(b) by 0 days.

(21) Appl. No.: 09/576,364

(22) Filed: May 22, 2000

(51) Int. Cl.$^7$ .............................. F16L 1/00; B63B 35/03
(52) U.S. Cl. ........................................ 405/158; 405/173
(58) Field of Search .............................. 405/154.1, 155, 405/158, 166, 169, 170, 173; 414/141.7, 142.8, 745.4

(56) References Cited

U.S. PATENT DOCUMENTS

| | | | |
|---|---|---|---|
| 3,266,353 A | * 8/1966 | Gretter et al. | 405/173 X |
| 3,834,169 A | * 9/1974 | Abbott | 405/170 |
| 4,234,268 A | * 11/1980 | Scodino | 405/158 |
| 4,335,752 A | * 6/1982 | Sumner | 405/154.1 X |
| 4,444,528 A | * 4/1984 | Scodino et al. | 405/173 |
| 4,832,530 A | * 5/1989 | Andersen et al. | 405/170 |
| 5,890,841 A | * 4/1999 | Friis | 405/170 |
| 5,934,832 A | * 8/1999 | Baugh | 405/173 |

FOREIGN PATENT DOCUMENTS

| | | | |
|---|---|---|---|
| GB | 2193775 A | * 2/1988 | 405/158 |
| GB | 2193776 A | * 2/1988 | 405/158 |

* cited by examiner

*Primary Examiner*—David Bagnell
*Assistant Examiner*—Jong-Suk Lee
(74) *Attorney, Agent, or Firm*—D. Neil LaHaye; Eric Marich; Rob Baraona

(57) ABSTRACT

A pipeline recovery tool is made from steel plates welded together instead of forging and machining. The rigged-up tool is lowered over the pipeline and engaged with the pipeline such that a fixed claw engages the collar on the pipeline. An ROV is used to cause a movable dog on the tool to engage the collar and then lock the fixed claw in position. Rigging on the fixed claw side of the tool is released. The pipeline is then lifted to the surface by a lift arm on the first end of the tool.

2 Claims, 4 Drawing Sheets

FIG. 7
FIG. 8
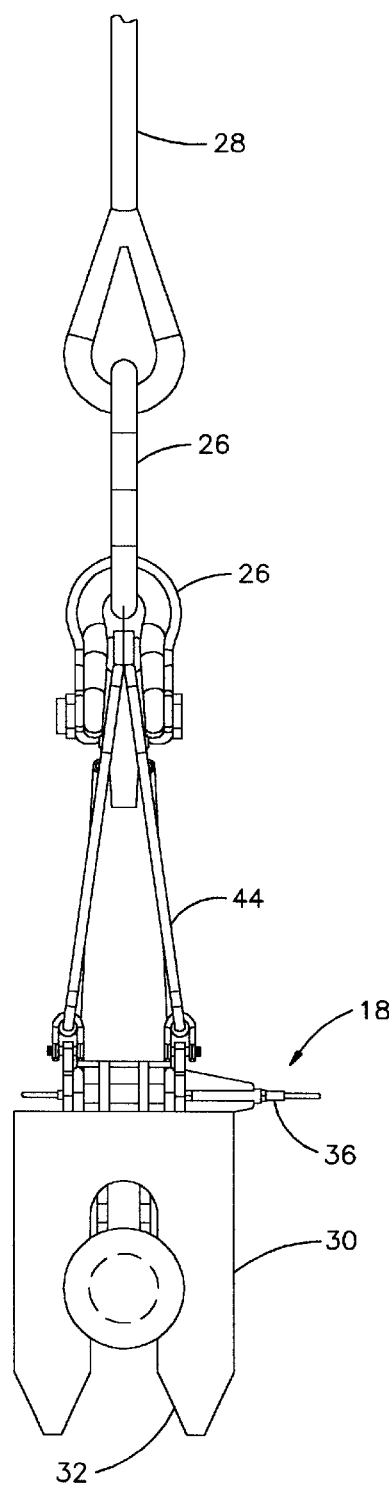
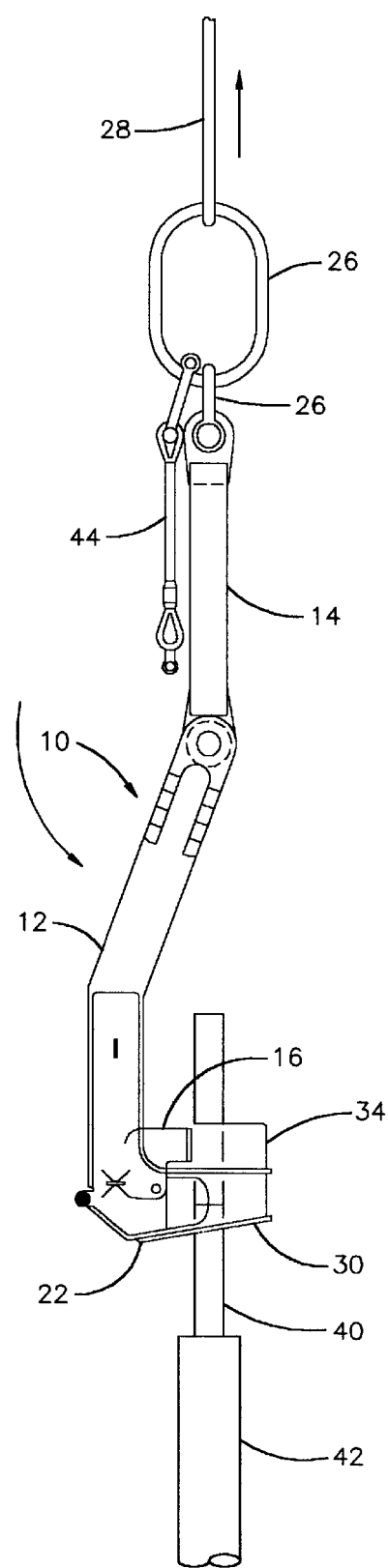

PIPELINE RECOVERY TOOL

BACKGROUND OF THE INVENTION

1. Field of the Invention

The invention is generally related to laying pipeline in deep water and more particularly to the recovery of pipeline in deep water.

2. General Background

During the course of pipe laying in deep water, the possibility of having to deal with buckled lines, damaged lines, or other instances where there is a need to recover the pipe exists. Normally, some kind of an attachment, so called head/hook, is attached to one end of the pipe for abandonment or recovery purposes. It is possible, however, that the head of the pipe may be damaged during the pipe laying operations or buried in the sea floor. In either case, the pipeline is retrieved with an emergency recovery tool.

The inventors are aware of a pipeline recovery tool designed by Oil States/Hydro Tech for twelve and three quarter inch pipe and eighteen inch diameter pipeline sizes. This device is made out of forged and machined pieces of steel. Forging and machining are expensive processes and require special machines and procedures and needs a long lead time for fabrication.

The current state of the art leaves a need for pipeline emergency recovery tools.

Pipelines in deep water are installed, in many instances, through a process that utilizes collars rigidly fixed to the pipeline at regular intervals. These collars embody various designs such as a short, heavy wall section of pipe with an "upset" or land at each end, as well as a short heavy wall section which includes an external ring. These collars function as buckle arrestors to inhibit buckle propagation along the pipeline. Collars are also used to facilitate pipeline installation, as they allow handling of pipe segments during pipe lay operations.

SUMMARY OF THE INVENTION

The invention addresses the above need. What is provided is a pipeline recovery tool that engages a collar on the pipeline at the desired location and recover the pipeline and reduces the material and fabrication costs of building such equipment. Instead of forging and machining, the tool is made from steel plates welded together. The rigged-up tool is lowered over the pipeline and engaged with the pipeline such that a fixed claw engages the collar on the pipe. An ROV is used to release a movable dog on the tool that engages the collar and then locks the fixed claw in position. The rigging on the fixed claw side of the tool is released. The pipeline is then lifted to the surface by a lift arm on the first end of the tool.

BRIEF DESCRIPTION OF THE DRAWINGS

For a further understanding of the nature and objects of the present invention reference should be made to the following description, taken in conjunction with the accompanying drawings in which like parts are given like reference numerals, and wherein:

FIG. 7 is a view taken along lines 7—7 in FIG. 6.

FIG. 8 illustrates the invention raising the pipeline.

DETAILED DESCRIPTION OF THE PREFERRED EMBODIMENT

Figure 1:
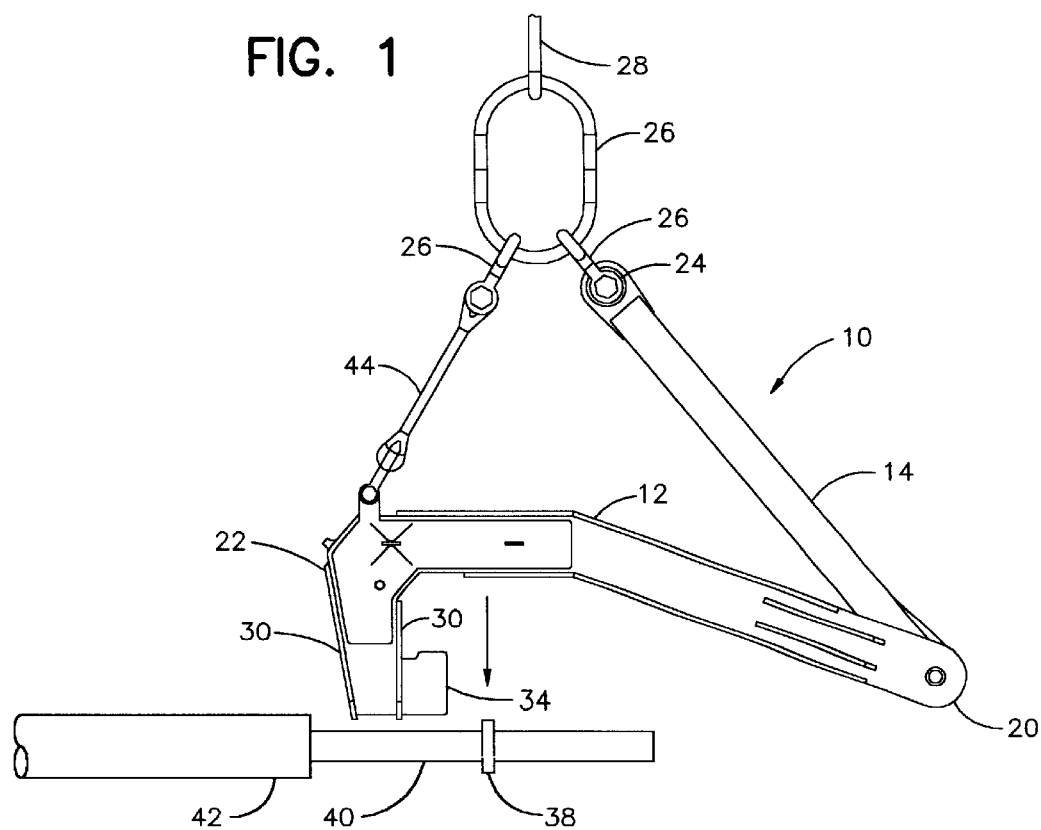
FIG. 1 illustrates the invention as it is being lowered toward a pipeline.

Referring to the drawings, it is seen in FIG. 1 that the invention is generally indicated by the numeral 10. Pipeline recovery tool 10 is generally comprised of a main body 12, a lift arm 14, a movable dog 16 (best seen in FIG. 6), and means 18 (best seen in FIG. 7) for locking the movable dog 16 in a desired position.

The main body 12 is constructed so as to have a bend that defines a dogleg bend between two ends. For ease of reference, the first end 20 will be referred to as the rigging end and the second end 22 will be referred to as the fixed claw end. The rigging end 20 is on the longer portion of the dog leg bend and the fixed claw end 22 is on the shorter end of the dogleg bend. The main body 12 is formed from a suitable rigid material such as steel plates that are welded together.

The first end of the lift arm 14 is pivotally attached to the rigging end 20 of the main body 12. The second end of the lift arm 14 is provided with an eye 24 that is adapted to be removably attached to lifting equipment such as shackles 26 and a cable 28. The lift arm 14 is preferably formed from a strong, rigid material such as steel.

The fixed claw end 22 of the main body 12 is provided with a pair of plates 30 that extend from the main body at nearly a right angle thereto. Relative to the dog leg bend in the main body, the plates 30 extend toward the smaller angle defined by the dogleg bend. In the operational position, when being lowered to the pipeline, the plates 30 extend downward. As best seen in FIG. 7, the plates 30 each have a U-shaped cutout 32 that faces away from the main body 12. The U-shaped cutout 32 is sized to fit around the outer diameter of the pipeline to be recovered. A fixed claw 34 is attached to each plate 30 on each side of the U-shaped cutout 32. The fixed claw 34 is perpendicular to the plates 30 and is shaped to fit around the collar on the pipeline.

The movable dog 16 is mounted in the fixed claw end 22 of the main body 12 so as to be rotatable between a first open position and a second closed position in which it engages the collar on the pipeline. The movable dog 16 is shaped to fit around the collar on the pipeline.

Means 18 for locking the movable dog 16 in either position is provided in the form of a pin 36 that is threaded through the main body 12.

Figure 2:
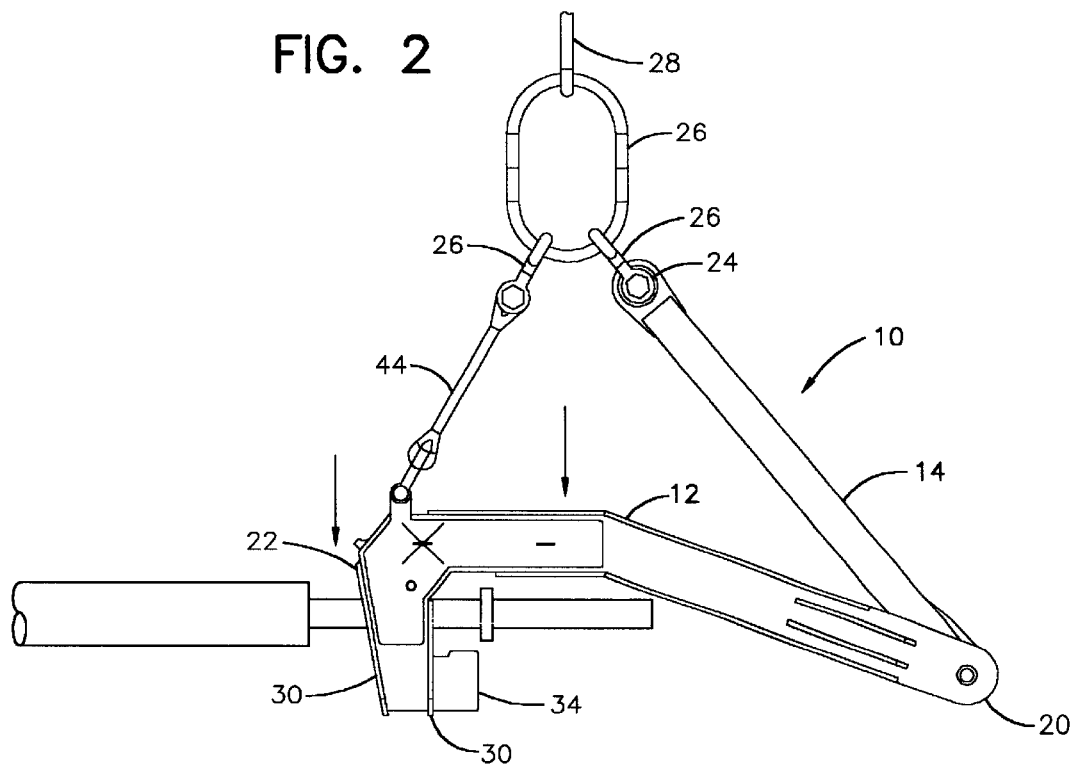
FIG. 2 illustrates the invention as it is lowered over the pipeline.
Figure 3:
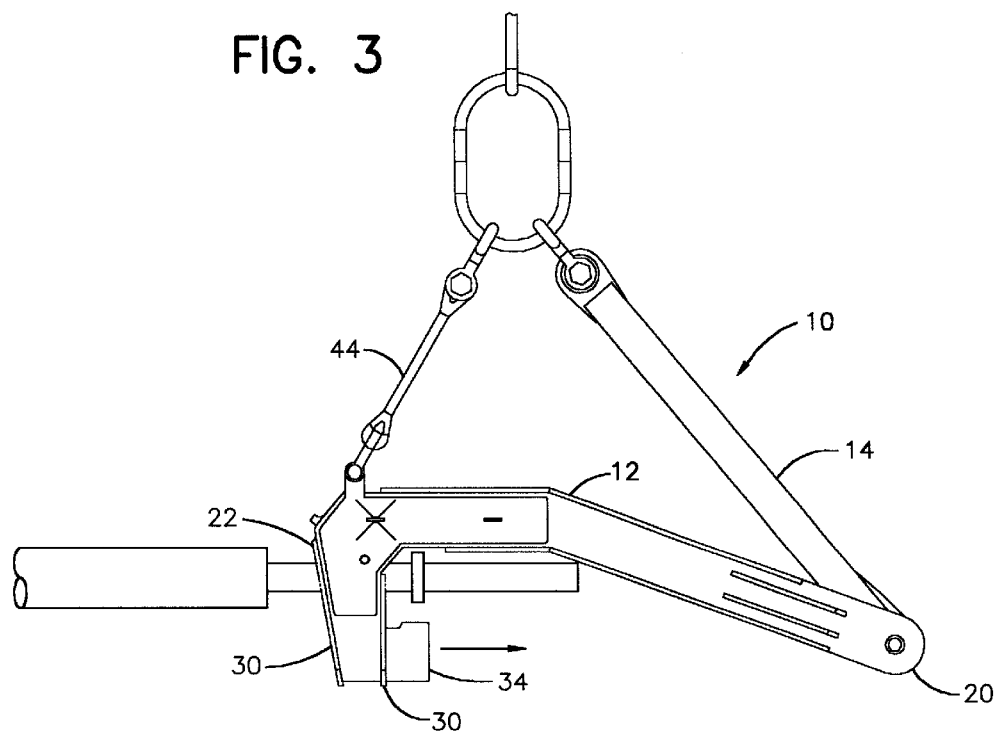
FIG. 3 illustrates the invention being moved into position to engage the pipeline.
Figure 4:
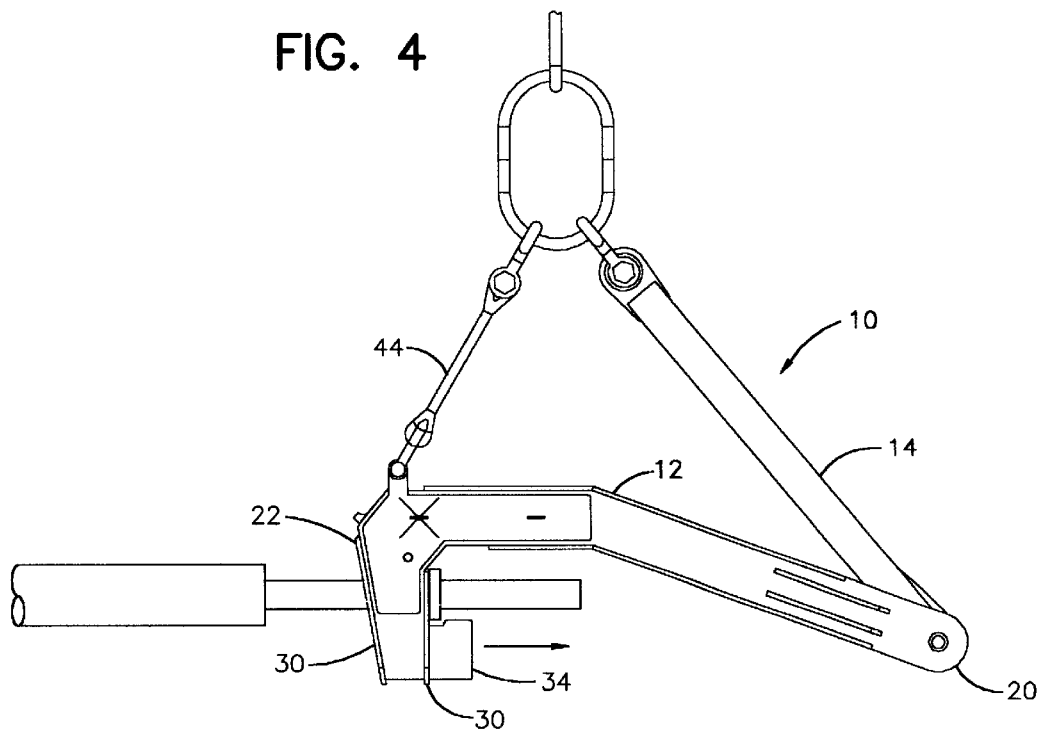
FIG. 4 illustrates the invention in position to engage a collar on the pipeline.
Figure 5:
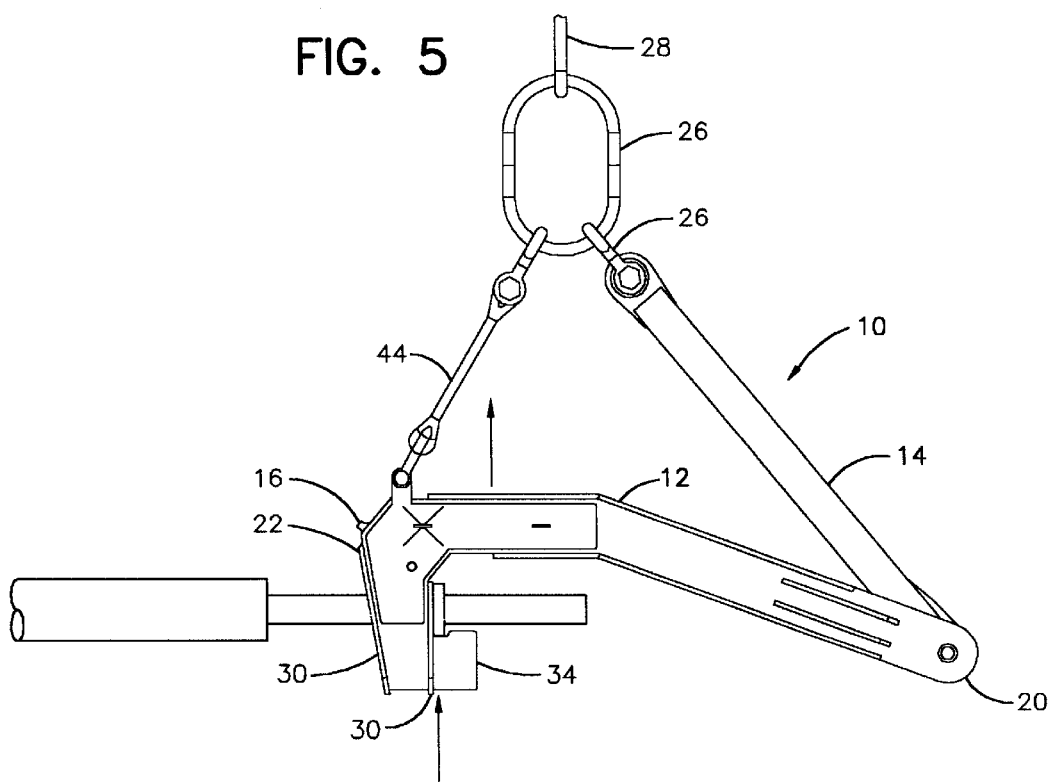
FIG. 5 illustrates the invention as it is being raised to engage with the collar on the pipeline.
Figure 6:
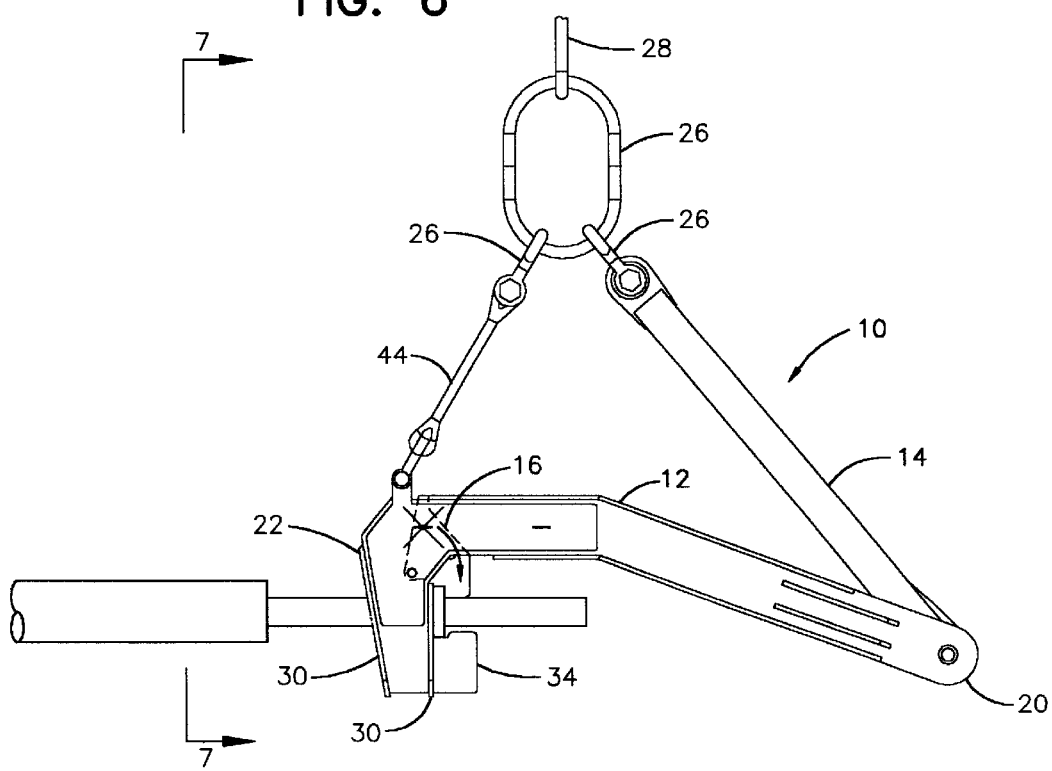
FIG. 6 illustrates the movable dog of the invention engaging the collar on the pipeline.

In operation, the nearest collar 38 to the lay down head or piece of pipeline 40 to be recovered is located. If the pipeline is insulated, an ROV (remotely operated vehicle) is used to remove the insulation or weight coating 42 around the collar 38 to expose the collar 38. The ROV is used to cut and remove the pipeline 40 away from the collar 38 on one side of the collar 38. Mud is jetted away from the bottom of the pipe to ease the engagement of the tool with the pipe and collar. The tool is lowered in a horizontal position as seen in FIG. 1 and 2 on the long side of the pipeline 40. When rigged for lowering and engaging the pipeline 40, the lift arm 14 (at the rigging end 20) and cable or sling 44 (at the fixed claw end 22) are both attached to a shackle and link 26. The shackle and link 26 is attached to a cable 28. This places the tool 10 in a substantially horizontal position relative to the pipeline 40. The tool is then moved horizontally as illustrated in FIG. 3 and 4 to align the fixed claw 34 with the collar 38. The tool is lifted vertically a sufficient distance as shown in FIG. 5 to engage the fixed claw 34 with the collar 38. An ROV is used to remove the pin 36 to release the movable dog 16 so that the movable dog 16 will drop over the collar 38 as shown in FIG. 6. The movable dog 16 has its pivot point positioned such that gravity causes the movable dog 16 to drop downward into engagement with the collar 38. When in its second closed position, the movable dog 16 is substantially aligned with and spaced apart from the fixed claw 34. The ROV is then used to replace the pin 36 to lock the movable dog 16 in the closed position around the collar 38. Two separate bores are provided through the movable dog 16 for receiving the pin 36 in each position. The ROV is used to release the cable or sling 44 on the fixed claw end 22 of the tool. As seen in FIG. 8, lifting the rigging end 20 of the tool 10 using the lift arm 14 raises the pipeline 40. The lift arm 14 pivots to position the tool 10 in a substantially vertical orientation. The fixed claw 34 and movable dog 16 hold the pipeline at the collar.

The invention provides several advantages over the known art. The invention is easy and economical to assemble and fabricate from readily available materials. The invention has only two moving parts. The invention is safe for the pipeline recovery procedure. The invention is easily modified in the field if needed. Since a pipeline recovery tool is normally used in case of emergency, the pipeline owner has the option of spending less money on a contingency device.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A pipeline recovery tool, comprising:
    a. a main body portion having first and second ends;
    b. a lift arm pivotally attached to the first end of said main body portion;
    c. a fixed claw shaped to engage a collar on a pipeline and positioned at the second end of said main body portion;
    d. a movable dog positioned at the second end of said main body portion and being movable between a first open position and a second closed position, said movable dog being shaped to engage a collar on a pipeline and be substantially aligned with and spaced apart from said fixed claw when in the second closed position; and
    e. means for selectively locking said movable dog in either the first or second position.

2. The pipeline recovery tool of claim 1, wherein said main body portion is shaped to define a dogleg bend.

* * * * *